United States Patent
Hirayama et al.

(10) Patent No.: US 12,246,780 B2
(45) Date of Patent: Mar. 11, 2025

(54) WORKING MACHINE

(71) Applicant: KOBELCO CONSTRUCTION MACHINERY CO., LTD., Hiroshima (JP)

(72) Inventors: Michio Hirayama, Hiroshima (JP); Seiichi Onishi, Hiroshima (JP); Naohito Matsushita, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 296 days.

(21) Appl. No.: 17/823,211

(22) Filed: Aug. 30, 2022

(65) Prior Publication Data

US 2023/0100150 A1   Mar. 30, 2023

(30) Foreign Application Priority Data

Sep. 30, 2021   (JP) .................................. 2021-161774

(51) Int. Cl.
*B62D 33/06*   (2006.01)
*E02F 9/08*   (2006.01)
(Continued)

(52) U.S. Cl.
CPC ............ *B62D 33/06* (2013.01); *E02F 9/0858* (2013.01); *E02F 9/163* (2013.01); *E02F 9/26* (2013.01)

(58) Field of Classification Search
CPC ........ B62D 33/06; E02F 9/0858; E02F 9/163; E02F 9/26
See application file for complete search history.

(56) References Cited

U.S. PATENT DOCUMENTS

2018/0058044 A1   3/2018   Deguchi et al.
2020/0173143 A1   6/2020   Kurokawa et al.
(Continued)

FOREIGN PATENT DOCUMENTS

CN   1621628 B  *  3/2012
EP   2 003 423 B1   3/2013
(Continued)

OTHER PUBLICATIONS

English translation of WO-2018012047-A1 (Year: 2018).*
Extended European Search Report issued on Feb. 16, 2023 in European Patent Application No. 22193839.2, 6 pages.

*Primary Examiner* — Lori Lyjak
(74) *Attorney, Agent, or Firm* — Oblon, McClelland, Maier & Neustadt, L.L.P.

(57) ABSTRACT

A working machine includes: a lower traveling body; an upper slewing body; a cab; a display device; and a detector. The upper slewing body is slewably mounted on the lower traveling body. The cab is mounted on the upper slewing body. The cab include: a front wall having a front window; a pair of left and right front pillars extending in an up-down direction respectively along left and right sides of the front window; and a pair of left and right side walls extending reward respectively from the left and right front pillars. The display device is disposed in a corner defined between one of the left and right side walls and the front wall in the cab while being fixedly attached to the one side wall or the front wall for displaying predetermined information. The detector is fixedly connected to the display device.

10 Claims, 7 Drawing Sheets

(51) Int. Cl.
*E02F 9/16* (2006.01)
*E02F 9/26* (2006.01)

(56) References Cited

U.S. PATENT DOCUMENTS

2020/0407952 A1    12/2020  Yamanaka et al.
2022/0136215 A1*    5/2022  Shiratani ................ B66C 13/46
                                                701/50

FOREIGN PATENT DOCUMENTS

| EP | 3 399 744 A1 | 11/2018 | |
| EP | 3 730 704 A1 | 10/2020 | |
| JP | 6553201 B2 | 7/2019 | |
| JP | 2019-203291 A | 11/2019 | |
| JP | 6673391 B2 * | 3/2020 | |
| JP | 6922730 B2 * | 8/2021 | |
| WO | WO-2017115808 A1 * | 7/2017 | ............... B60R 1/00 |
| WO | WO-2018012047 A1 * | 1/2018 | ................ B60J 1/00 |
| WO | WO 2019/039522 A1 | 2/2019 | |
| WO | WO 2020/196516 A1 | 10/2020 | |

* cited by examiner

WORKING MACHINE

FIELD OF THE INVENTION

The present invention relates to a working machine.

BACKGROUND ART

Working machines including hydraulic excavators have been recently developed to perform advanced control along with a progress of electronification and multi-functionalization. Furthermore, there has been an increasing number of opportunities to mount a detector like a camera or a sensor for assisting a manipulation of an operator on such a working machine.

For instance, Japanese Patent Publication No. 6553201 discloses an excavator including a stereo camera for picking up an image of an image pick-up range in front of a vehicular main body. The stereo camera is arranged in a cab along an upper edge defining a front window.

Besides, Japanese Unexamined Patent Publication No. 2019-203291 discloses a hydraulic excavator including an imaging device for taking an image of a work implement. In the hydraulic excavator, the work implement is adjacent to a right surface of a cab and supported on a revolving unit, and the imaging device is disposed in the cab and in a vicinity of a left front pillar in the cab. Of a pair of the left and right front pillars, the left front pillar is away from the work implement farther than the right front pillar.

In a configuration where a detector is arranged along an upper edge defining a front window as described in Japanese Patent Publication No. 6553201 or arranged in a vicinity of a pillar as described in Japanese Unexamined Patent Publication No. 2019-203291 in a cab, the detector may have a detection region containing the upper edge defining the front window or the pillar and accordingly may fail to accurately detect information in front of a working machine.

An object of the present invention is to facilitate arrangement of a detector at such a position as to ensure a visible range in front of an upper slewing body.

SUMMARY OF THE INVENTION

To achieve the object, a detector is fixedly connected to a display device disposed in a front area in a cab in the present invention.

Specifically, the present invention provides a working machine. The working machine includes a lower traveling body, an upper slewing body, a cab, a display device, and a detector. The upper slewing body is slewably mounted on the lower traveling body. The cab is mounted on the upper slewing body. The cab includes: a front wall having a front window; a pair of left and right front pillars extending in an up-down direction respectively along left and right sides of the front window; and a pair of left and right side walls extending reward respectively from the left and right front pillars. The display device is disposed in a corner defined between one of the left and right side walls and the front wall in the cab while being fixedly attached to the one side wall or the front wall for displaying predetermined information. The detector is fixedly connected to the display device for detecting information in front of the upper slewing body.

DESCRIPTION OF EMBODIMENTS

Hereinafter, an embodiment of the present invention will be described with reference to the accompanying drawings. However, the following description is inherently a mere example, and does not delimit the present invention, and application thereof or usage thereof.

For convenience of explanation, the drawings show arrows each denoting a front-rear direction representing a traveling direction of a working machine, a left-right direction (called a left-right direction of an upper slewing body, and a left-right direction of a cab as well) representing a lateral direction from a view of an operator on the working machine, and an up-down direction representing a vertical direction of the working machine. Unless otherwise mentioned, the description proceeds with reference to the directions denoted by the arrows.

Figure 1:
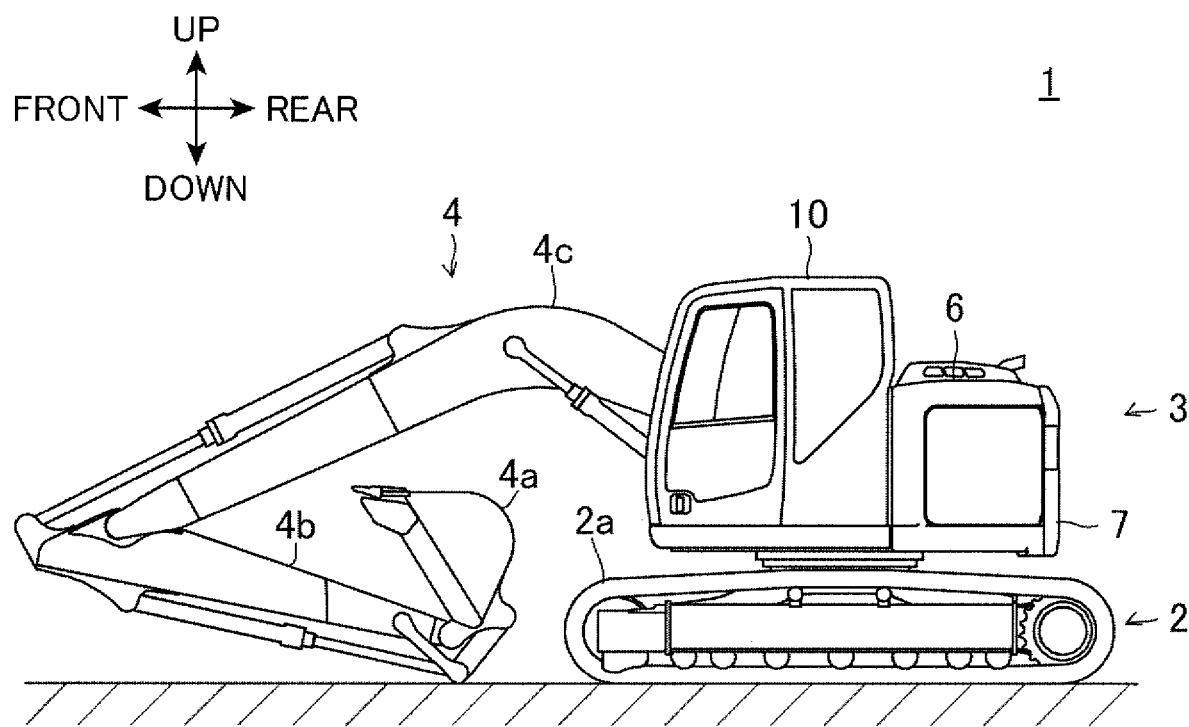
FIG. 1 is a schematic side view of a working machine according to an embodiment of the present invention.

FIG. 1 is a schematic side view of a working machine according to the embodiment. As shown in FIG. 1, the working machine according to the embodiment is, for example, a hydraulic excavator 1. The hydraulic excavator 1 includes a lower traveling body 2 having a pair of left and right crawlers 2a, and an upper slewing body 3 mounted thereon slewably via a slewing bearing. The hydraulic excavator 1 includes an attachment 4, a cab 10, a machine chamber 6, and a counterweight 7 each mounted on the upper slewing body 3.

The attachment 4 includes a bucket 4a, an arm 4b, and a boom 4c. The attachment 4 can perform various working operations including excavation in response to a rotation of each of the bucket 4a, the arm 4b, and the boom 4c under a drive control by a hydraulic cylinder. In a plan view of the upper slewing body 3, the boom 4c is tiltably and pivotally supported at a substantially center of the upper slewing body 3 in the left-right direction thereof and in front of the machine chamber 6, and extends frontward of the hydraulic excavator 1, as shown in FIG. 2.

The counterweight 7 has a heavy weight and lies on a rear end of the upper slewing body 3 to keep a balance with the attachment 4 that performs works in the front-rear direction. The machine chamber 6 is covered with a cover and located in front of the counterweight 7, and accommodates therein a driving device, such as an engine and a hydraulic pump. The machine chamber 6 further includes therein a fuel tank and a hydraulic fluid tank accompanied by the driving device.

Figure 2:
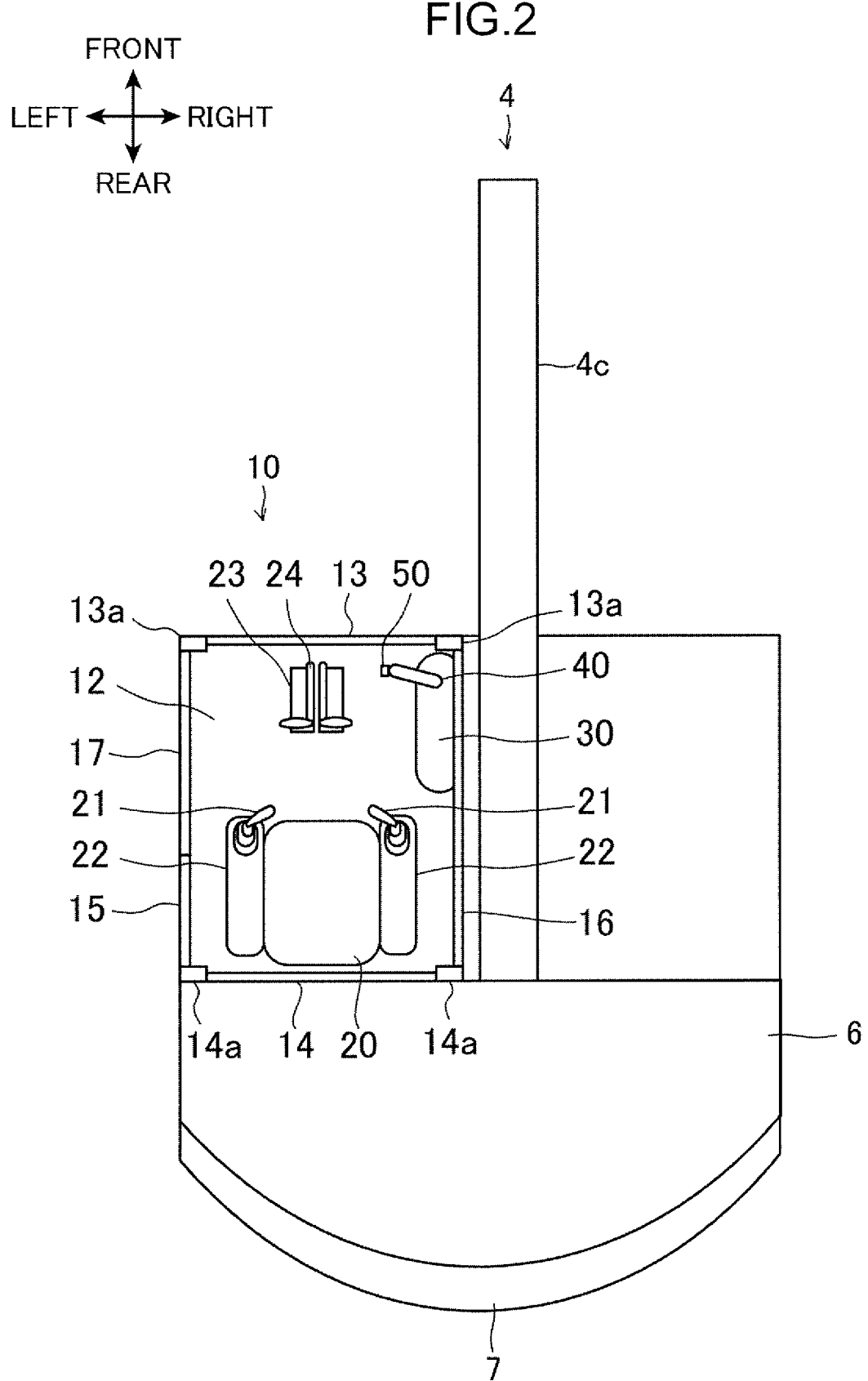
FIG. 2 is a schematic plan view of an upper slewing body in the embodiment of the present invention.
Figure 3:
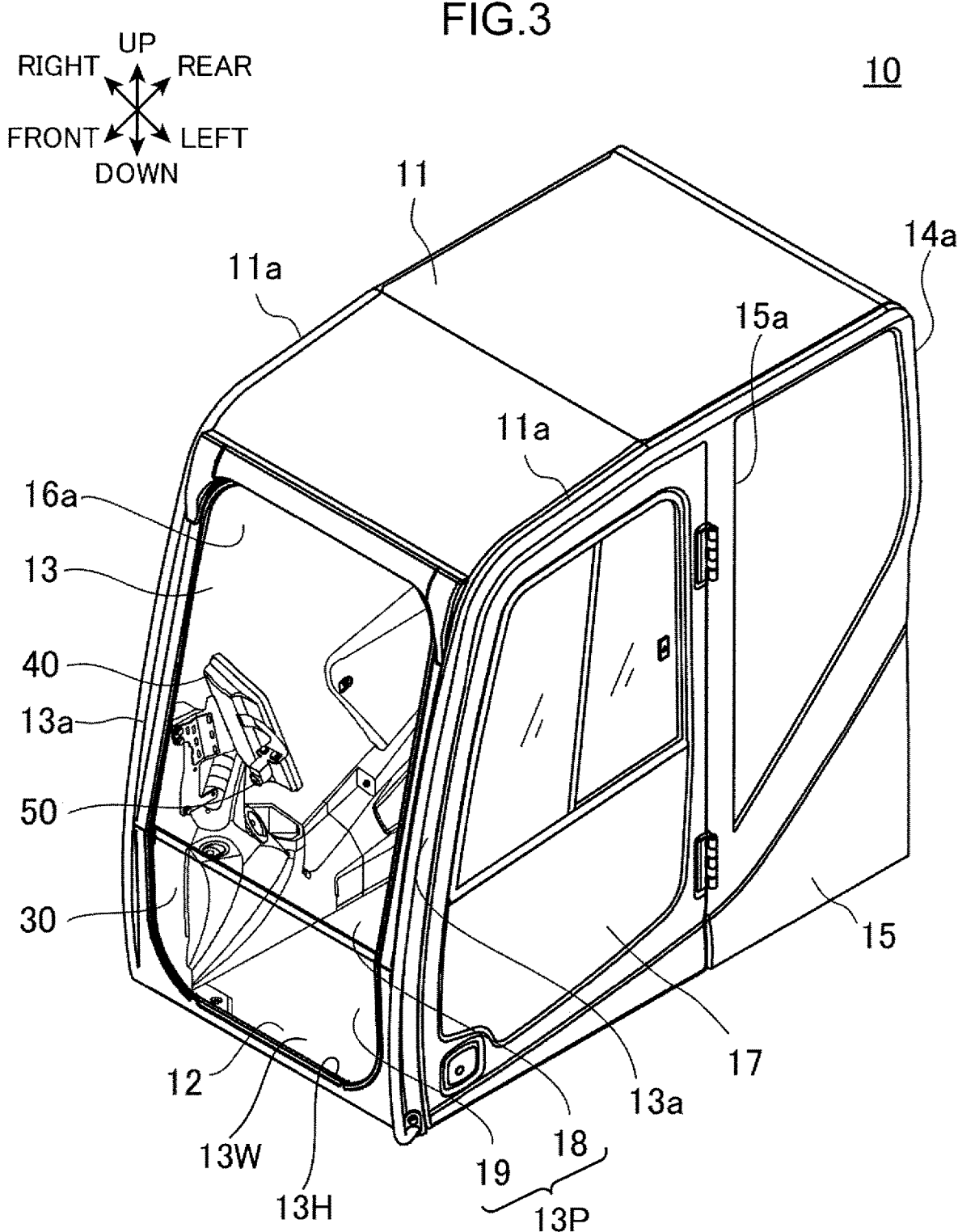
FIG. 3 is a perspective view of a cab in the embodiment of the present invention.

FIG. 2 is a schematic plan view of the upper slewing body 3 in the embodiment. FIG. 2 excludes illustration of a top surface of the cab 10. FIG. 3 is a perspective view of the cab 10 in the embodiment. FIG. 3 illustrates only a main portion for an inside of the cab 10. The cab 10 is adjacent to the attachment 4 on a left side thereof in front of the machine chamber 6. As shown in FIG. 2 and FIG. 3, the cab 10 is a box-shaped operation compartment defined by a top wall 11, a bottom wall 12, a front wall 13, a rear wall 14, and left and right side walls 15, 16. A large portion of each of the front wall, rear wall, and left and right side walls is occupied by a window, and accordingly, the cab 10 has a structure excellent in visibility. The cab 10 has, in the inside, a space for execution of operations of the hydraulic excavator 1 relevant to a working manipulation of the attachment 4, a travelling manipulation of the crawlers 2a, a slewing manipulation of the upper slewing body 3, and other manipulations.

The operator can get in the cab 10 through a getting-in-and-out section 17 formed in one of the side walls of the cab 10 in the left-right direction. In the embodiment, the right side wall 16 of the cab 10 is adjacent to the attachment 4, and the left side wall 15 has the getting-in-and-out section 17.

The cab 10 includes, as frame members, a pair of left and right top frame members 11a extending in the front-rear direction respectively along left and right sides of the top wall 11, a pair of left and right front pillars 13a extending downward respectively from front ends of the top frame members 11a, a door pillar 15a extending downward from a substantially center of the left top frame member 11a in the front-rear direction, and a pair of left and right rear pillars 14a extending downward respectively from rear ends of the top frame members 11a. The left and right side walls 15, 16 extend rearward respectively from the left and right front pillars 13a.

The front wall 13 has a front window 13W located between the left and right front pillars 13a. In other words, the left and right front pillars 13a extend in the up-down direction respectively along left and right sides of the front window 13W. The front window 13W has a window opening section 13H defined in the front wall 13 and is provided with a transparent front window member 13P (transparent member) for the window opening section. The front window member 13P includes an upper front window member section 18 at an upper position and a lower front window member section 19 at a lower position. The upper front window member section 18 is openable and closable. The front window member 13P for closing the window opening section 13H is made of material like glass and resin. The transparency of the front window member may be appropriately set in accordance with usage of the hydraulic excavator 1.

Figure 4:
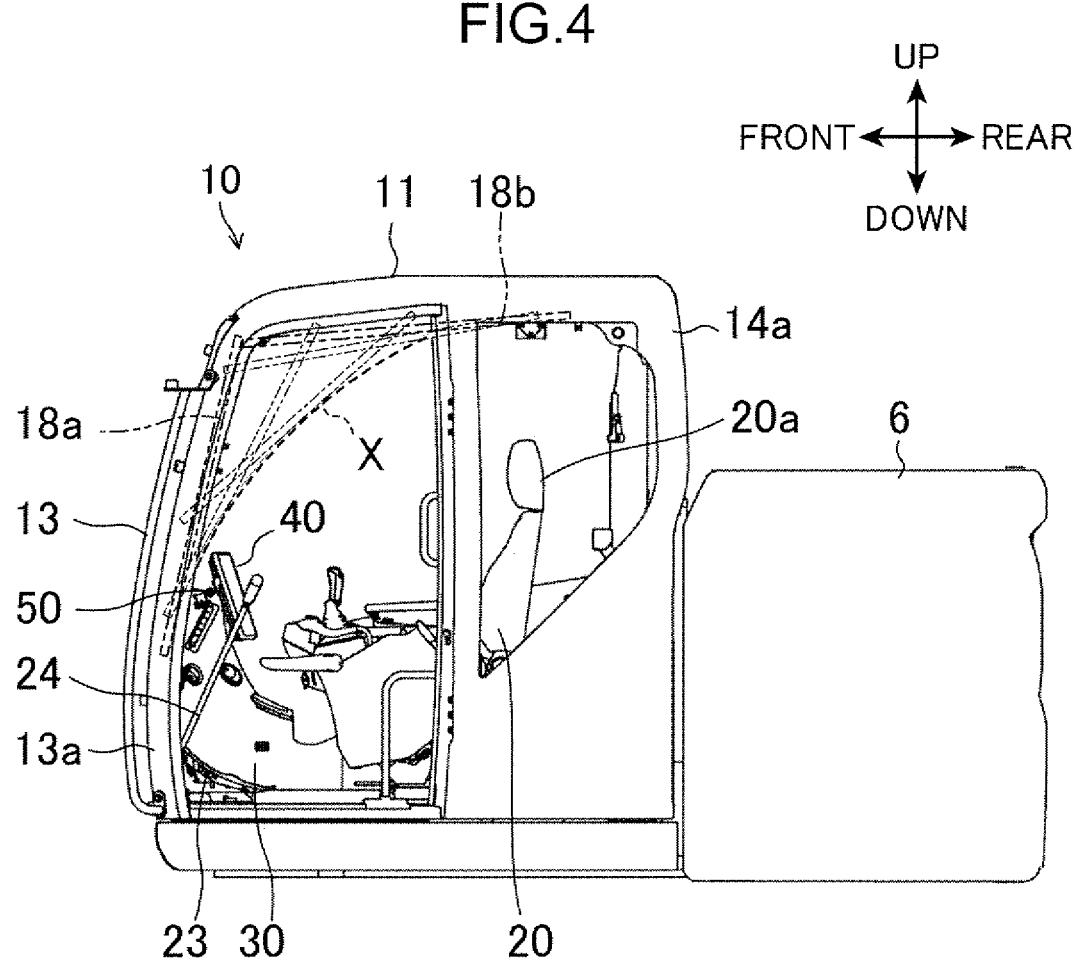
FIG. 4 is a schematic side view showing a shifting state of a front window member of the cab in the embodiment of the present invention, and a position of a detector.

FIG. 4 is a schematic side view showing a shifting state of the upper front window member section 18 of the cab 10 in the embodiment, and a position of a detector 50 to be described later. FIG. 4 excludes illustration of the getting-in-and-out section 17. The upper front window member section 18 is shiftable between a position (closing position) 18a to close the window opening section 13H (FIG. 3) defined in the front wall 13 of the cab 10 and a position (opening position) 18b where the upper front window member section is accommodated below the top wall 11 of the cab 10 to open the window opening section 13H in the cab 10, as denoted by a long dashed and double-short dashed line in FIG. 4.

The upper front window member section 18 has an inner end X (on an inner plane) forming a shift locus in an arc shape in a front upper area of the cab 10 as denoted by a dashed line in FIG. 4 in a side view. Specifically, in a side view, the shift locus of the upper front window member section 18 falls within a range enclosed by: the inner end X having the are shape to connect a lower portion of the front wall 13 than a center thereof in the up-down direction to a rear portion of the top wall 11 from the center thereof in the front-rear direction; the upper front window member section 18 at the closing position 18a; and the upper front window member section 18 at the opening position 18b.

Each of the left and right front pillars 13a has an unillustrated rail for allowing the upper front window member section 18 to slide therein. Similarly, each of the left and right top frame members 11a has an unillustrated rail for allowing the upper front window member 18 to slide therein in the front-rear direction.

The cab 10 includes, in the inside, an operator seat 20 disposed on the bottom wall 12 for allowing the operator to sit thereon. The operator seat 20 has an upper portion provided with a headrest 20a. A console box 22 including a manipulation lever 21 for manipulating the attachment 4 is provided on each of left and right sides of the operator seat 20. A traveling pedal 23 and a traveling lever 24 are provided in front of and below the operator seat 20.

The side wall 16 of the cab 10 facing the getting-in-and-out section 17 in the left-right direction is provided with a panel 30. The panel 30 protrudes upward from a front and lower portion of the side wall 16. Specifically, in the embodiment, the right side wall 16 of the cab 10 adjacent to the attachment 4 has the lower portion provided with an air conditioning unit, a ventilation duct, and various wires (not shown). The panel 30 extends upward from the bottom wall 12 to cover the air conditioning unit and other elements, and forms an inner surface of the side wall 16. The panel 30 obliquely extends upward from a vicinity of the operator seat 20 to the front pillar 13a to be gradually higher as advancing from the rear to the front.

Figure 5:
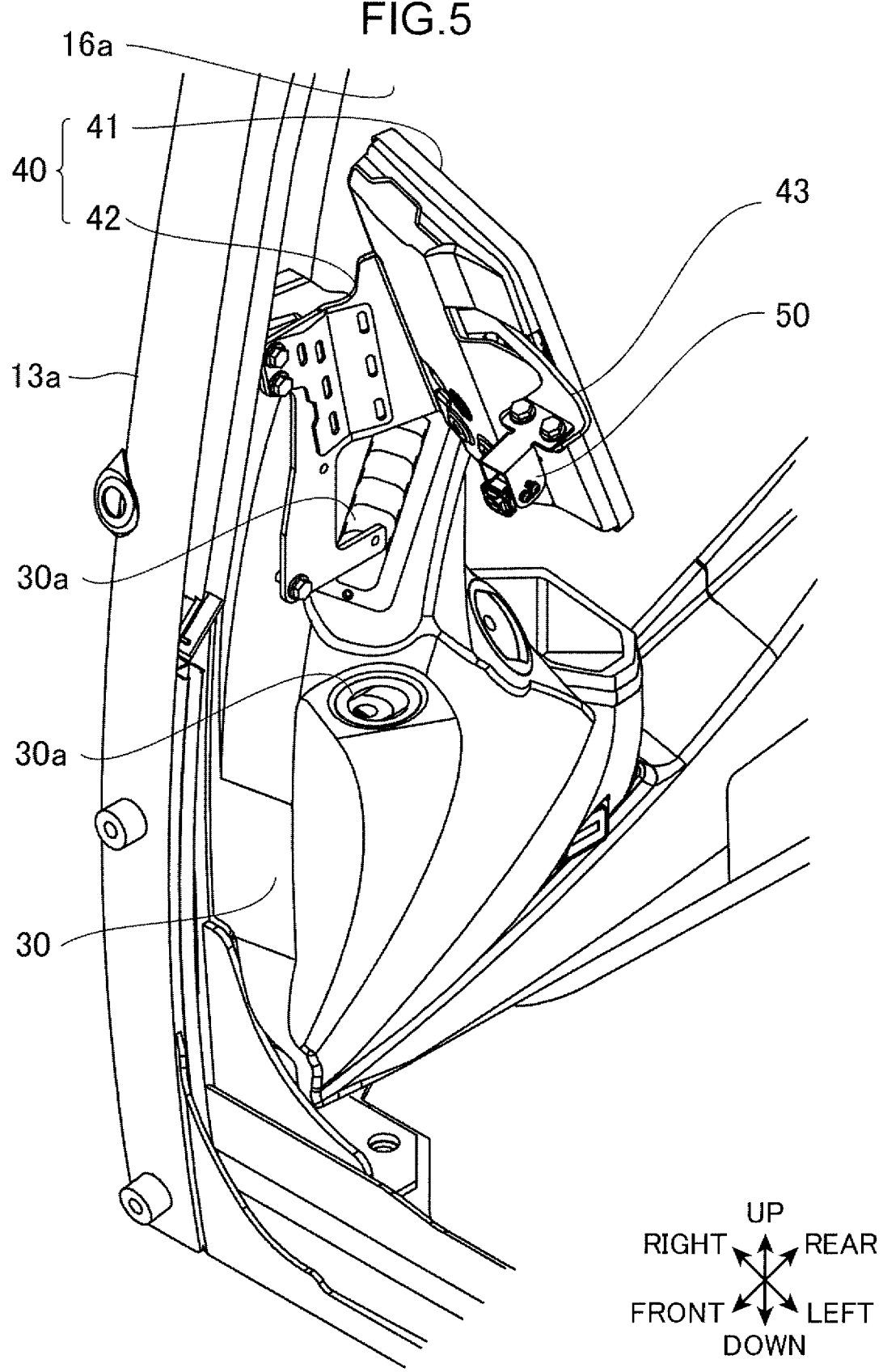
FIG. 5 is a perspective view of a main portion of the cab in the embodiment of the present invention.

FIG. 5 is a perspective view of the main portion of the cab 10 in the embodiment. FIG. 5 excludes illustration of the front window 13W (FIG. 3). As shown in FIG. 5, the panel 30 has a plurality of outlet holes 30a for an air conditioner. The side wall 16 has a right window 16a (side window) located above the panel 30.

The hydraulic excavator 1 further includes a display device 40 fixedly attached to an upper portion (top) of the panel 30. Specifically, as shown in FIG. 4, the upper portion of the panel 30 to which the display device 40 is fixedly attached is at a position higher than a seat base of the operator seat 20 and lower than the headrest 20a.

Figure 6:
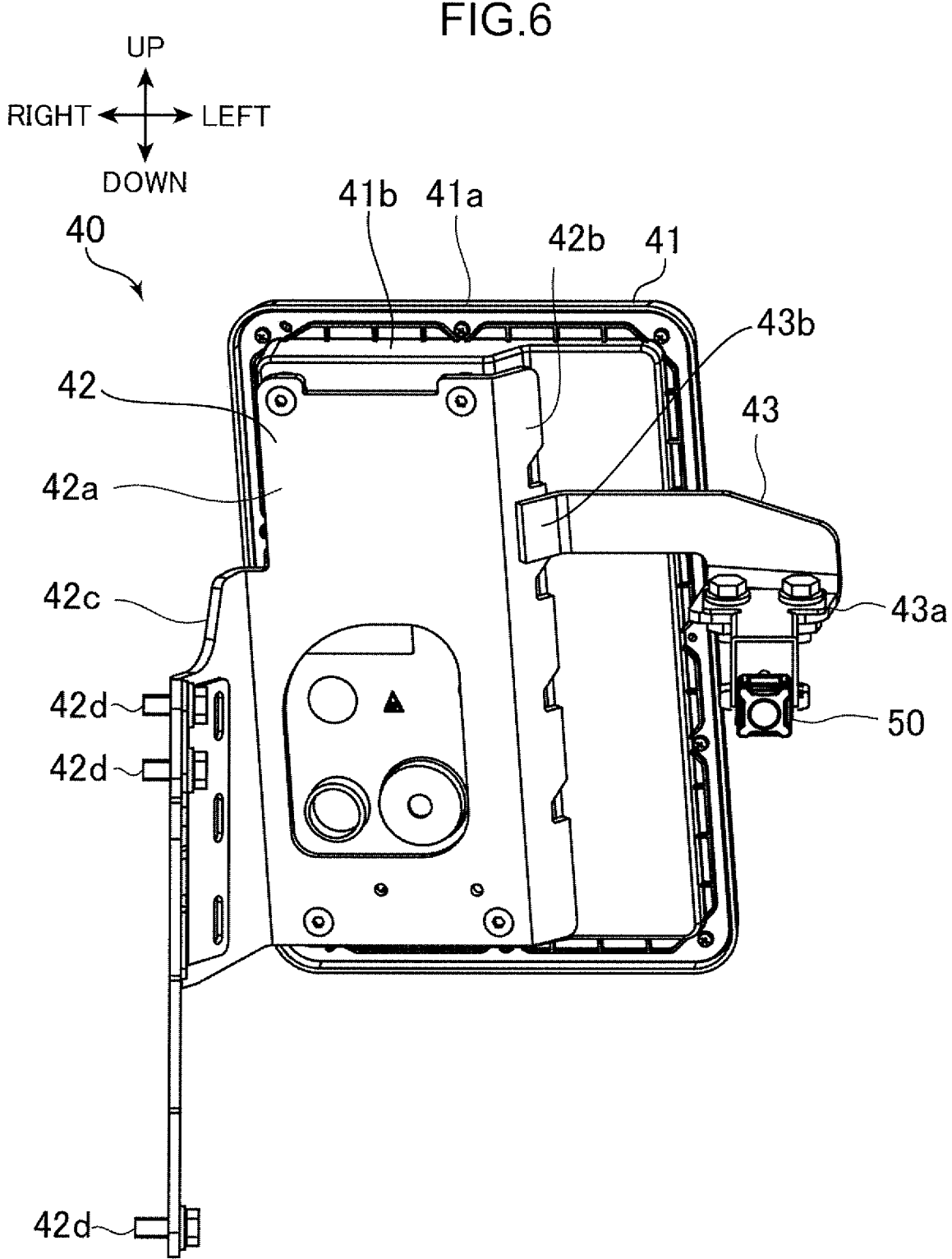
FIG. 6 is a front view showing a display device and the detector in the embodiment of the present invention.

As shown in FIG. 6, the display device 40 includes a display part 41 and a display part support member 42 (display screen attaching bracket) for supporting the display part 41. The display device 40 is fixedly attached to the panel 30 at the display part support member 42. The display part 41 includes a display part main body 41a (FIG. 6) having a display screen, such as a touch screen, and an outer frame surrounding the display screen. The outer frame of the display part 41 is made of, for example, resin material. As shown in FIG. 6, the display part main body 41a of the display part 41 has a back surface on which a box-shaped container 41b for accommodating electrical components is disposed. The box-shaped container 41b is located in a substantially right-half region of the display part main body 41a.

The display part 41 can display various kinds of information representing a state of the hydraulic excavator 1, e.g., as indicated by a cluster gauge, and the operator can manipulate the display part 41. The display part 41 is attached to the display part support member 42 in a posture of facing the headrest 20a at a position obliquely downward from a sightline of the operator so as to be visible and operable by the operator sitting on the operator seat 20.

The display part support member 42 is made of, for example, metal material. The display part support member 42 has a display part support plate 42*a*, a fixing section 42*b*, and a fixed section 42*c*.

Figure 7:
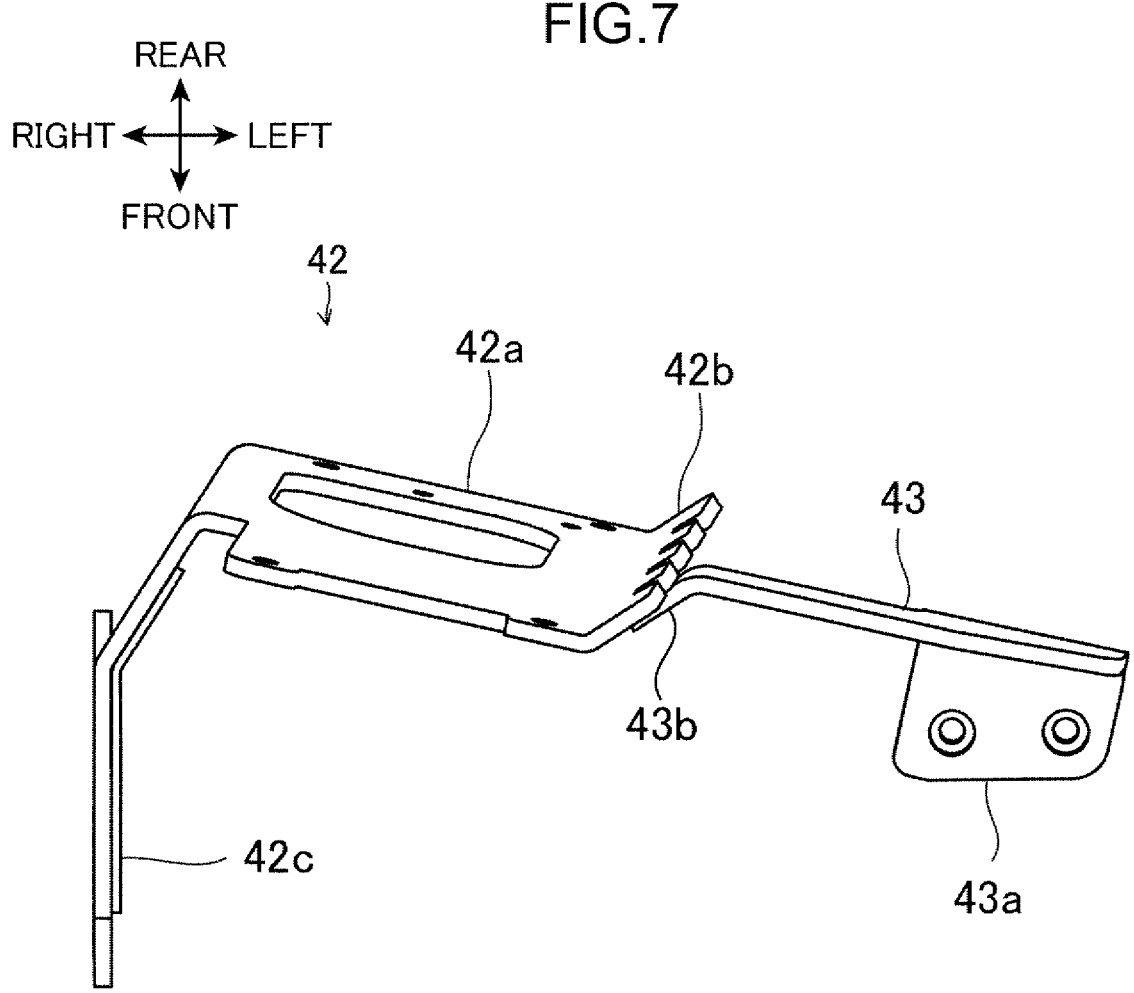
FIG. 7 is a plan view of a display part support member in the embodiment of the present invention.

The display part support plate 42*a* is a rectangular flat member extending along a back surface (surface located at a front position in the front-rear direction) of the display part 41 as shown in FIG. 7. The display part 41 is fastened to the display part support plate 42*a* with, for example, a bolt. The fixing section 42*b* is connected to the display part support plate 42*a* along a left edge thereof in such a manner as to extend rearward. The fixing section 42*b* agrees with a side surface of the box-shaped container 41*b* of the display part 41.

The fixed section 42*c* is connected to a right end of the display part support plate 42*a* in such a manner as to extend frontward. The fixed section 42*c* has a front end extending downward farther than the display part support plate 42*a* and formed with three screw holes at intervals in the up-down direction. Each of the screw holes receives a screw 42*d* inserted therethrough so that the fixed section 42*c* is fixedly attached to the upper portion of the panel 30. The panel 30 has an exterior made of resin except a specific portion where the fixed section 42*c* made of metal is fixed and exposed. As shown in FIG. 7, the display part support plate 42*a* and the fixed section 42*c* form a predetermined angle therebetween in a plan view. With this configuration, the display part 41 fixedly attached to the display part support plate 42*a* is arranged to face the headrest 20*a* at the position obliquely downward from the sightline of the operator so as to be visible and operative by the operator sitting on the operator seat 20.

The hydraulic excavator 1 further includes the detector 50. The detector 50 is fixedly connected to the display device 40 so as to be located at a position closer to the center of the cab 10 in the left-right direction thereof than an inner (left) surface of the display device 40 in the left-right direction thereof. Specifically, the hydraulic excavator 1 further includes a detector retainer 43 (retainer) (FIG. 6, FIG. 7). The detector retainer 43 extends from the fixing section 42*b* at a left edge portion of the display part support member 42 toward the center of the cab 10 in the left-right direction thereof, and the detector retainer 43 further has a distal end to which the detector 50 is fixedly attached. As also shown in FIG. 6, the distal end of the detector retainer 43 bends frontward to form a detector attachment section 43*a*. The detector attachment section 43 retains (fixedly holds) the detector 50. The detector retainer 43 causes the detector 50 to be spaced leftward from the display part 41. In the embodiment, as shown in FIG. 6, the detector 50 is firmly connected to the panel 30 via the display part support member 42 and the detector retainer 43 each made of metal. Further, the detector retainer 43 has a proximal end 43*b* which may be connected (fixedly attached) to the fixing section 42*b* of the display part support member 42 by way of welding, a bolt, adhesion, or other way. In this manner, the detector 50 is retrofittable to a display device 40 preliminarily fixedly attached to the panel 30 in the hydraulic excavator 1.

Furthermore, in the embodiment, as shown in FIG. 4, the detector 50 is arranged (fixed) at an inner position than the shift locus of the upper front window member section 18 (transparent member) in the cab 10, i.e., at a rear position therein. This configuration can ensure the detection accuracy of the detector 50 without contact between the detector 50 and the upper front window member section 18 even in opening and closing of the upper front window member section 18. Moreover, the upper front window member section 18 is smoothly openable and closable.

As shown in FIG. 5 and FIG. 6, the detector 50 faces frontward to detect information in front of the upper slewing body 3. The detector 50 includes, for example, an image-capturing device like a camera, or a sensor like a RIDAR and a millimeter-wave radar. In the embodiment, the detector 50 is a camera which can capture an image in front of the upper slewing body 3.

Furthermore, as described above, the display part support member 42 supporting the display device 40 is made of material having high attachment strength, such as metal. Hence, the attachment strength of the detector 50 is easily ensured owing to the connection of the detector retainer 43 to the display part support member 42 and the fixed attachment of the detector 50 to the end of the detector retainer 43. This configuration eliminates the need of changing each frame member (e.g., pillar) of the cab 10, and thus achieves facilitated attachment of the detector 50. Besides, the detector 50 is easily retrofittable to an already provided display device 40.

Furthermore, in the embodiment, the display device 40 is disposed in the corner defined between the right side wall 16 and the front wall 13 in the cab 10 while being fixedly attached to the right side wall 16. In this manner, the detector 50 is fixedly connected to the display device 40. This arrangement allows the detector 50 to be spaced apart from the right front pillar 13*a*, and thus can keep the front pillar 13*a* and other frame members from entering the detection range of the detector 50 and ensure the detection accuracy. The detector 50 can detect a range approximating to a vision field of the operator on the operator seat 20.

In particular, the display device 40 is at an inner position than the left and right front pillars 13*a* in the left-right direction and faces the front window 13W in the front-rear direction. This arrangement allows the detector 50 to be further spaced apart from each front pillar 13*a*, and accordingly, the detector 50 can detect a range further approximating to the vision field of the operator.

Moreover, the detector 50 is fixedly connected to the display device 40. Accordingly, when the display device 40 displays an image captured by the detector 50, the operator can easily grasp an orientation and a position of the captured image. In other words, it takes a long time to intuitively grasp an orientation of a captured image displayed on the display device 40 in a configuration where the detector 50 and the display device 40 are at different positions from each other. In the configuration where the detector 50 is fixedly connected to the display device 40, the operator has many occasions to look around the display device 40, for example, when getting in the cab. Accordingly, the operator can easily find a physical malfunction of the detector 50.

In the embodiment, the right side wall 16 has the right window 16*a* and the panel 30 located below the right window 16*a* and in the cab 10, and the display device 40 is fixedly attached to the upper portion of the panel 30. In this manner, the display device 40 is easily and stably fixed in the corner. As a result, the position of the detector 50 is stably kept. The display device 40 is fixedly attached to the upper portion of the panel 30, and therefore, the display device 40 is easily arrangeable at a predetermined height from the bottom wall 12.

In particular, the upper portion of the panel 30 obliquely extends upward as advancing to the front window 13W, and has the top to which the display device 40 is fixedly attached. Hence, the display device 40 is arrangeable at a relatively higher position to meet the sightline of the operator. The display device 40 may be fixedly attached to other portion of the panel 30.

In the embodiment, the panel 30 has the outlet hole 30a for blowing out air to at least a space between the front window 13W and the detector 50, as shown in FIG. 3 to FIG. 5. Therefore, the air having blown out of the outlet hole 30a reaches the detector 50, resulting in preventing a large amount of dusts from being deposited and accumulating on the detector 50. In particular, a configuration where the detector 50 is in the form of a camera including lens suppresses a defect in a captured image attributed to dusts. Moreover, when the hydraulic excavator 1 performs a certain work in winter, warm air blowing out of the outlet hole 30a reduces fogging of a specific portion of the front window 13W located in front of the detector 50. Consequently, the detector 50 can accurately detect information in front.

Other Embodiments

The working machine according to the present invention is not limited to the above-described embodiment, and covers various configurations.

Although described above is the aspect where the detector 50 is spaced from the display device 40 in the left-right direction in the embodiment, the detector 50 may be fixedly attached to the display device 40 to overlap the display device 40 (be hidden by the display device 40) within a dimension thereof from a view of the operator on the operator seat 20. Specifically, the detector 50 may be arranged on the back surface (surface located at the front position in the front-rear direction) of the display part 41 to fall within the dimension of the display part 41, and fixedly attached thereto so as to be hidden by the display part 41 from the view of the operator on the operator seat 20. The detector 50 in this arrangement can avoid obstructing the vision field of the operator. The detector 50 having this configuration can detect a range approximating to the vision field of the operator in comparison with a detector 50 directly fixed to the front pillar 13a.

The display device 40 may be provided to a front portion of the other (left) side wall 15 in the left-right direction. Specifically, the display device 40 may be disposed in another corner defined between the left side wall 15 and the front wall 13 in the cab 10 while being fixedly attached to the left side wall 15.

In addition, the display device 40 may be attached to the front pillar 13a via, for example, a bracket (fixing member) without limitation to the upper portion of the panel 30.

The display device 40 may be fixedly attached to the front wall 13 without limitation to the side walls 15, 16. For example, the panel 30 may be arranged inside a portion of the front wall 13, corresponding to the lower front window member section 19 shown in FIG. 3, which is not opened, and the display device 40 may be fixedly attached to the panel 30.

The working machine according to the present invention may be another working machine without limitation to the hydraulic excavator.

The present invention provides a working machine. The working machine includes a lower traveling body, an upper slewing body, a cab, a display device, and a detector. The upper slewing body is slewably mounted on the lower traveling body. The cab is mounted on the upper slewing body. The cab includes: a front wall having a front window; a pair of left and right front pillars extending in an up-down direction respectively along left and right sides of the front window; and a pair of left and right side walls extending reward respectively from the left and right front pillars. The display device is disposed in a corner defined between one of the left and right side walls and the front wall in the cab while being fixedly attached to the one side wall or the front wall for displaying predetermined information. The detector is fixedly connected to the display device for detecting information in front of the upper slewing body.

In this configuration, the display device may be at an inner position than the left and right front pillars in a left-right direction and faces the front window in a front-rear direction.

In this configuration, the one side wall may have a side window and a panel located below the side window and in the cab, and the display device may be fixedly attached to an upper portion of the panel.

In this configuration, the upper portion of the panel obliquely may extend upward as advancing to the front window, and the display device may be fixedly attached to a top of the upper portion of the panel.

In this configuration, the panel may have an outlet hole for blowing out air to at least a space between the front window and the detector.

In this configuration, the detector may be fixedly connected to the display device so as to be located at a position closer to a center of the cab in the left-right direction thereof than an inner surface of the display device in the left-right direction thereof.

In this configuration, the display device may include: a display part; and a display part support member fixedly attached to the one side wall or the front wall for supporting the display part. The working machine may further include a retainer connected to the display part support member to retain the detector.

In this configuration, the cab may include an operator seat configured to allow an operator to sit thereon, and the detector may be fixedly connected to the display device so as to be hidden by the display device from a view of the operator on the operator seat.

In this configuration, the cab may further include a top wall, and the front window may have a window opening section defined in the front wall and be provided with a transparent member for the window opening section, the transparent member being located below the top wall and configured to be shiftable between a closing position and an opening position to close the window opening section at the closing position and open the window opening section at the opening position in the cab, and the detector may be in the rear of a shift locus of the transparent member between the closing position and the opening position.

This application is based on Japanese Patent application No. 2021-161774 filed in Japan Patent Office on Sep. 30, 2021, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A working machine, comprising:
a lower traveling body;
an upper slewing body slewably mounted on the lower traveling body;

a cab mounted on the upper slewing body, the cab including: a front wall having a front window; a pair of left and right front pillars extending in an up-down direction respectively along left and right sides of the front window; and a pair of left and right side walls extending reward respectively from the left and right front pillars;

a display device disposed in a corner defined between one of the left and right side walls and the front wall in the cab while being fixedly attached to the one side wall or the front wall for displaying predetermined information; and a detector fixedly connected to the display device for detecting information in front of the upper slewing body, wherein the one side wall has a side window and a panel located below the side window and in the cab, and wherein the display device is fixedly attached to an upper portion of the panel.

2. The working machine according to claim 1, wherein the display device is at an inner position than the left and right front pillars in a left-right direction and faces the front window in a front-rear direction.

3. The working machine according to claim 1, wherein the upper portion of the panel obliquely extends upward as advancing to the front window, and the display device is fixedly attached to a top of the upper portion of the panel.

4. The working machine according to claim 1, wherein the panel has an outlet hole for blowing out air to at least a space between the front window and the detector.

5. A working machine, comprising:

a lower traveling body:

an upper slewing body slewably mounted on the lower traveling body:

a cab mounted on the upper slewing body, the cab including: a front wall having a front window; a pair of left and right front pillars extending in an up-down direction respectively along left and right sides of the front window; and a pair of left and right side walls extending reward respectively from the left and right front pillars;

a display device disposed in a corner defined between one of the left and right side walls and the front wall in the cab while being fixedly attached to the one side wall or the front wall for displaying predetermined information; and a detector fixedly connected to the display device for detecting information in front of the upper slewing body, wherein the detector is fixedly connected to the display device so as to be located at a position closer to a center of the cab in the left-right direction thereof than an inner surface of the display device in the left-right direction thereof.

6. A working machine, comprising:

a lower traveling body:

an upper slewing body slewably mounted on the lower traveling body;

a cab mounted on the upper slewing body, the cab including: a front wall having a front window; a pair of left and right front pillars extending in an up-down direction respectively along left and right sides of the front window; and a pair of left and right side walls extending reward respectively from the left and right front pillars;

a display device disposed in a corner defined between one of the left and right side walls and the front wall in the cab while being fixedly attached to the one side wall or the front wall for displaying predetermined information; and a detector fixedly connected to the display device for detecting information in front of the upper slewing body, wherein the display device includes:

a display part; and a display part support member fixedly attached to the one side wall or the front wall for supporting the display part, the working machine further comprising a retainer connected to the display part support member to retain the detector.

7. The working machine according to claim 1, wherein the cab includes an operator seat configured to allow an operator to sit thereon, and the detector is fixedly connected to the display device so as to be hidden by the display device from a view of the operator on the operator seat.

8. The working machine according to claim 1, wherein the cab further includes a top wall, the front window has a window opening section defined in the front wall and is provided with a transparent member for the window opening section, the transparent member being located below the top wall and configured to be shiftable between a closing position and an opening position to close the window opening section at the closing position and open the window opening section at the opening position in the cab, and the detector is in the rear of a shift locus of the transparent member between the closing position and the opening position.

9. The working machine according to claim 6, wherein the cab includes an operator seat configured to allow an operator to sit thereon, and the detector is fixedly connected to the display device so as to be hidden by the display device from a view of the operator on the operator seat.

10. A working machine, comprising:

a lower traveling body;

an upper slewing body slewably mounted on the lower traveling body;

a cab mounted on the upper slewing body, the cab including: a front wall having a front window; a pair of left and right front pillars extending in an up-down direction respectively along left and right sides of the front window; and a pair of left and right side walls extending reward respectively from the left and right front pillars;

a display device disposed in a corner defined between one of the left and right side walls and the front wall in the cab while being fixedly attached to the one side wall or the front wall for displaying predetermined information; and a detector retrofittably fixed to the display device at a position spaced from the display device in a left-right direction for detecting information in front of the upper slewing body.

* * * * *